US011555142B2

(12) United States Patent
Farmer et al.

(10) Patent No.: US 11,555,142 B2
(45) Date of Patent: Jan. 17, 2023

(54) TWO-STEP PROCESS FOR MICROBIAL ENHANCED OIL RECOVERY

(71) Applicant: Locus Solutions IPCo, LLC, Solon, OH (US)

(72) Inventors: Sean Farmer, North Miami Beach, FL (US); Ken Alibek, Solon, OH (US)

(73) Assignee: LOCUS SOLUTIONS IPCO, LLC, Solon, OH (US)

( * ) Notice: Subject to any disclaimer, the term of this patent is extended or adjusted under 35 U.S.C. 154(b) by 17 days.

(21) Appl. No.: 16/634,318

(22) PCT Filed: Jul. 17, 2018

(86) PCT No.: PCT/US2018/042427
§ 371 (c)(1),
(2) Date: Jan. 27, 2020

(87) PCT Pub. No.: WO2019/022998
PCT Pub. Date: Jan. 31, 2019

(65) Prior Publication Data
US 2020/0157408 A1 May 21, 2020

Related U.S. Application Data

(60) Provisional application No. 62/537,574, filed on Jul. 27, 2017, provisional application No. 62/537,079, filed on Jul. 26, 2017.

(51) Int. Cl.
*C09K 8/582* (2006.01)
*C09K 8/584* (2006.01)
*C09K 8/42* (2006.01)

(52) U.S. Cl.
CPC .............. *C09K 8/582* (2013.01); *C09K 8/584* (2013.01); *C09K 8/426* (2013.01)

(58) Field of Classification Search
CPC ......... C09K 8/582; C09K 8/584; C09K 8/426
See application file for complete search history.

(56) References Cited

U.S. PATENT DOCUMENTS

| | | | | |
|---|---|---|---|---|
| 4,450,908 A | * | 5/1984 | Hitzman | C09K 8/905 166/246 |
| 4,522,261 A | | 6/1985 | McInerney et al. | |
| 4,561,501 A | | 12/1985 | Shaw et al. | |
| 4,905,761 A | * | 3/1990 | Bryant | C09K 8/58 435/252.4 |
| 9,422,470 B2 | | 8/2016 | Xu et al. | |
| 9,725,986 B2 | | 8/2017 | Xu et al. | |
| 2007/0151726 A1 | | 7/2007 | Crews et al. | |
| 2009/0029879 A1 | | 1/2009 | Soni et al. | |
| 2010/0044031 A1 | | 2/2010 | Fallon et al. | |
| 2012/0292022 A1 | | 11/2012 | Choban et al. | |
| 2013/0062053 A1 | | 3/2013 | Kohr et al. | |
| 2014/0315765 A1 | | 10/2014 | McDaniel | |
| 2014/0332212 A1 | | 11/2014 | Ayers et al. | |
| 2015/0037302 A1 | * | 2/2015 | Bralkowski | A61P 17/00 424/93.46 |
| 2016/0040119 A1 | * | 2/2016 | Hashman | A61P 3/02 424/93.46 |
| 2016/0160111 A1 | | 6/2016 | Smith et al. | |
| 2016/0222280 A1 | * | 8/2016 | Kohr | C12N 1/26 |

FOREIGN PATENT DOCUMENTS

| | | | |
|---|---|---|---|
| CN | 1540137 A | * | 10/2004 |
| CN | 102352227 A | | 2/2012 |

OTHER PUBLICATIONS

Amani, H., et al., "Comparative study of biosurfactant producing bacteria in MEOR applications." Journal of Petroleum Science and Engineering. 2010, 75: 209-214.
De Almeida, D., et al., "Biosurfactants: Promising Molecules for Petroleum Biotechnology Advances." Frontiers in Microbiology, Oct. 2016, 7(1718): 1-14.
De Brito, D., Biosurfactants from renewable raw materials, Universidade do Minho Departamento de Engenharia Biologica, Nov. 2013, pp. 1-93.
De Oliveira, M., et al., "Review: Sophorolipids A Promising Biosurfactant and it's Applications." International Journal of Advanced Biotechnology and Research, 2015, 6(2): 161-174.
El-Sheshtawy, H.S., et al., "Production of biosurfactants by Bacillus licheniformis and Candida albicans for application in microbial enhanced oil recovery." Egyptian Journal of Petroleum, 2016, 25: 293-298.
Ghojavand, H. et al., "Isolation of thermotolerant, halotolerant, facultative biosurfactant-producing bacteria." Appl. Microbiol. Biotechnol, Oct. 2008, 80(6): Abstract, doi: 10,1007/s00253-008-1570-7.
Gudina, E., et al., "Biosurfactant-producing and oil-degrading *Bacillus subtilis* strains enhance oil recovery in laboratory sand-pack columns." Journal of Hazardous Materials, 2013, 261: 106-113.
Nur, H.A., et al., "*Saccharomyces cerevisiae* from Baker's Yeast for Lower Oil Viscosity and Beneficial Metabolite to Improve Oil Recovery: An Overview." Applied Mechanics and Materials, 2014, 625: 522-525.
Pacwa-Plociniczak, M. et al., "Review: Environmental Applications of Biosurfactants: Recent Advances." Int. J. Mol. Sci., 2011, 12: 633-654.
Sen, R., "Biosurfactants: Advances in Experimental Medicine and Biology." Landes Bioscience and Springer Science +Business Media, LLC, 2010, 672: 1-331.

(Continued)

Primary Examiner — Kumar R Bhushan
(74) Attorney, Agent, or Firm — Saliwanchik, Lloyd & Eisenschenk

(57) ABSTRACT

The subject invention relates to methods for post-primary oil recovery that utilize multiple mechanisms of action, wherein biochemical-producing microbes are injected into an oil well in a certain predetermined order, based on, for example, the metabolites and by-products they are capable of producing. Preferably, gas-, acid- and/or solvent-producing microbe such as a *Clostridium* bacterium, is injected into the well first, followed by a biosurfactant and/or biopolymer-producing microbe, such as *Bacillus subtilis, Bacillus licheniformis* and/or a combination thereof.

11 Claims, No Drawings

(56) References Cited

OTHER PUBLICATIONS

Sharma, A. et al., "A study on biosurfactant production in *Lactobacillus* and *Bacillus* sp." Int. J. Curr. Microbiol. App. Sci., 2014, 3(11): 723-733.

* cited by examiner

TWO-STEP PROCESS FOR MICROBIAL ENHANCED OIL RECOVERY

CROSS-REFERENCE TO RELATED APPLICATIONS

This application is a National Stage Application of International Application No. PCT/US2018/042427, filed Jul. 17, 2018; which claims priority to U.S. Provisional Patent Applications No. 62/537,079, filed Jul. 26, 2017, and No. 62/537,574, filed Jul. 27, 2017, all of which are incorporated by reference herein in their entirety.

BACKGROUND OF THE INVENTION

The high demand for fossil fuels necessitates efficient production of oil. As oil wells mature, it becomes more difficult and costly to continue to pump oil at an economically viable rate. Therefore, there is a continuing need to develop improved methods of oil recovery.

Oil exists in small pores and narrow fissures within the body of reservoir rocks underneath the surface of the earth. Natural pressure of the reservoir causes the oil to flow up to the surface, thereby providing primary production; however as oil production progresses, the reservoir pressure is depleted to a point at which artificial lift or pumping is required to maintain an economical rate of oil production.

When it is necessary to provide external energy for the reservoir to achieve additional oil recovery (secondary oil recovery), there exist technologies for increasing pressure in a reservoir to "push" the remaining oil to the surface. One method involves injecting gas, e.g., carbon dioxide or nitrogen into an oil reservoir, while another method involves injecting water (waterflooding). The effect is a repressurization of the reservoir, causing oil displacement from trapped capillaries and enhancing mobilization of the oil to the producing wells. While these methods can be useful for producing a certain amount of additional oil, the methods often must overcome the challenges of, for example, low or variable permeability within a formation.

With waterflooding, for example, injected fluids flow preferentially along highly permeable layers, by-passing oil-saturated areas, or oil "islands," in the reservoir. Therefore, an increasing quantity of water rises with the oil and, by decreasing the ratio of oil to water, it eventually becomes uneconomical to continue the process.

Primary recovery generally results in an average recovery of only a fraction of the oil originally present in an oil bearing formation. Secondary recovery, e.g., water flooding, generally recovers another 10% by the time it becomes uneconomical to continue. It is not unusual, then, for 60 to 70% of the oil originally in the formation to remain, even after secondary recovery reaches is economical limit. In this situation, a third stage of oil recovery/EOR, so-called tertiary production, can be considered.

At this tertiary stage, technically advanced methods are employed to either modify the properties of reservoir fluids or the reservoir rock characteristics. In general, the methods can be classified into four main categories as thermal methods, chemical methods, miscible or solvent injection, and microbial methods.

Microbial Enhanced Oil Recovery (MEOR) is a multidisciplinary field incorporating, among others: geology, chemistry, microbiology, fluid mechanics, petroleum engineering, environmental engineering and chemical engineering. The microbial processes proceeding in MEOR can be classified according to the oil production problem in the field: well bore clean-up removes mud and other debris blocking the channels where oil flows; well stimulation improves the flow of oil from the drainage area into the well bore; and enhanced water floods increase microbial activity by injecting selected microbes and sometimes nutrients.

Thus, MEOR uses microorganisms and/or their metabolites to enhance the recovery of residual oil. With MEOR, nutrients and microorganisms, which preferably grow under the anaerobic reservoir conditions, are injected into the reservoir. Microbial by-products, which can include biosurfactants, biopolymers, acids, solvents, gases, and enzymes, for example, can modify the properties of the oil and the interactions between oil, water, and the porous media, alter the permeability of subterranean formations, and ultimately increase the mobility and recovery of oil.

Interest in microbial surfactants, for example, has been steadily increasing in recent years due to their diversity, environmentally friendly nature, possibility of large-scale production, selectivity, performance under extreme conditions, and potential applications in environmental protection. Microbially produced surfactants, i.e., biosurfactants reduce the interfacial tension between water and oil and, therefore, a lower hydrostatic pressure is required to move the liquid entrapped in the pores to overcome the capillary effect. Secondly, biosurfactants contribute to the formation of micelles providing a physical mechanism to mobilize oil in a moving aqueous phase.

In addition to microbial surfactants, microbially produced polymers, a type of biopolymer, are also becoming increasingly important in the oil and gas industry. Polymers can be used in enhanced water flooding operations, particularly in cases where formation permeability has becoming highly heterogeneous and selective plugging is necessary to alter permeability levels. In microbial enhanced water flooding, biopolymer-producing microbes are injected into a well. Their biopolymer growth byproducts, as well as the biomass, can then act to selectively plug the high permeability zones of the formation. This then allows for the injected flood water to by-pass the high permeability zones, where there is no longer oil, to reach the low permeability zones, where oil is still present.

There is a continuing need for improved methods of oil recovery, including methods of post-primary oil recovery, that can activate multiple mechanisms of wellbore stimulation. These mechanisms include, for example, enhancing the properties of crude oil, enhancing the flow of oil from an oil-bearing formation, and enhancing the pressurization of a formation.

BRIEF SUMMARY OF THE INVENTION

The subject invention relates to post-primary oil recovery from oil-bearing subterranean formations. In particular, the subject invention provides cost-effective, environmentally-friendly approaches to enhancing oil recovery by activating and/or enhancing multiple mechanisms of basic wellbore stimulation using microbes, as well as by-products of their growth.

In one embodiment, the subject invention provides microbe-based products comprising beneficial microbes and metabolites derived from these microbes and the fermentation broth in which they are produced. The microbes can be bacteria capable of producing, for example, biosurfactants, biopolymers, enzymes, solvents and/or gases.

Preferably, the microbes are spore-forming bacteria, which allows the microbes to be transported through the pores of the reservoir in spore form, ensuring penetration of the microbe-based products deep into a formation, including its high permeability areas. After penetrating deep into the formation, the spores can germinate and grow to produce biomass and desirable metabolites.

The microbe-based products are capable of displacing residual oil from reservoirs by employing multiple mechanisms of enhanced oil recovery (EOR) and/or well stimulation. These mechanisms include, but are not limited to, selective and non-selective plugging of formation pores; formation repressurization; emulsification of crude fluids; removal of thief channels in permeable zones; modification of solid surfaces within a formation; degradation of oil and alteration of oil properties, such as viscosity and pour point; modification of reservoir rock to improve porosity and permeability; solubilization of carbonate rocks; and reduction in interfacial tension and rock wettability.

Efficient methods of producing these microbe-based products, as well as methods of their use in enhanced oil recovery are also provided. In some embodiments, the subject compositions are useful for enhancing the performance of a marginal or stripper oil well, a well undergoing gas injection or water flooding, or any other type of oil and/or gas well.

In one embodiment, the microbe-based products according to the subject invention are obtained through cultivation processes ranging from small scale (e.g., lab setting) to large scale (e.g., industrial setting), which can be implemented at or near the site of application. These cultivation processes include, but not limited to, submerged cultivation/fermentation, solid state fermentation (SSF), and combination thereof.

Preferably, the microbe-based products are formulated based on the potential growth, metabolite production and survivability of the microbes under reservoir conditions. In certain embodiments, the microorganisms of the microbe-based products can germinate and grow in situ, i.e., inside an oil-bearing formation, and produce beneficial growth by-products at a treatment site. Consequently, a high concentration of the beneficial growth by-products and the microorganisms that produce them can be achieved easily and continuously at a treatment site.

In a specific embodiment, a first microbe-based product is provided, comprising one or more spore-forming bacteria, and/or growth by-products thereof. More specifically, the microbe of the first microbe-based product is a spore-forming bacteria capable of producing, for example, gases, acids and/or solvents in anaerobic or microaerophilic environments. Preferably, the microbe is a member of the genus *Clostridium*, including but not limited to cultivated *Clostridium butyricum*, *Clostridium tyrobutyricum*, *Clostridium acetobutyricum* and *Clostridium* NIPER 7 (88% homology with *Clostridium beijerinckii*).

In another specific embodiment, a second microbe-based product is provided, comprising one or more spore-forming biosurfactant-producing microorganisms and/or growth by-products thereof. More specifically, the microbe of the second microbe-based product is *Bacillus subtilis*, which is an effective producer of, for example, lipopeptide biosurfactants such as surfactin. In one embodiment, the *Bacillus subtilis* is a strain considered surfactant-over-producing.

In yet another specific embodiment, a third microbe-based product is provided, comprising one or more spore-forming biopolymer-producing microorganisms and/or growth by-products thereof. More specifically, the microbe of the third microbe-based product is *Bacillus licheniformis*, which is an effective producer of, for example, the biopolymer levan. *B. licheniformis* is also an effective producer of lipopeptide biosurfactants, such as, for example, lichenysin.

In certain embodiments, the subject invention provides methods for improving oil production efficiency and/or for enhanced oil recovery, wherein compositions comprising microbes and/or growth by-products thereof are applied to an oil well.

The methods can involve one or two steps, each of which involves injecting a microbe-based product or a combination thereof, into an oil well. The order of the microbe-based products that are injected into an oil well is based on, for example, the growth by-products a particular microbe is capable of producing. Furthermore, the method can comprise applying nutrients for microbial growth with the microbe-based products.

In a specific embodiment, the subject method comprises two steps, wherein step one comprises applying a first microbe-based product to an oil well. Preferably, the microbe of the first microbe-based product is any spore-forming bacteria capable of producing a gas (e.g., carbon dioxide), an acid and/or a solvent under reservoir conditions. For example, the microbe can be a species of *Clostridium* bacteria.

The gases, acids and/or solvents produced by the growth of these microbes within a formation can help to re-pressurize the formation, induce oil swelling and reduce viscosity of crude oil, increase the permeability of the formation through solubilization of carbonate rocks, modify reservoir rocks and/or improve porosity and permeability of the oil-bearing formation.

In some embodiments, step one further comprises adding an aqueous solution of one or more proteolytic enzymes to the first microbe-based product prior to application in order to hydrolyze the microbial exosporium. This provides smaller sized spores (e.g., about 1 micron), which can enhance the spores' ability to penetrate the formation's high permeability zones via pore throats. The proteolytic enzymes can be commercially available microbial peptidases or proteinases, and/or a microbial supernatant of bacteria, yeast and fungi containing these enzymes.

In one embodiment, step one of the method further comprises injecting water or filtered brine into the oil well after the application of the first microbe-based product. The injection of water or filtered brine aids in pushing the spores of the first microbe-based product deep into the well prior to their germination.

Step one of the method is followed by step two, which comprises applying second and third microbe-based products to the oil well. In one embodiment, the second microbe-based product, comprising a biosurfactant-producing, spore-forming bacteria and/or growth by-products thereof is applied first, followed by the third microbe-based product, comprising a biopolymer-producing, spore-forming bacteria and/or growth by-products thereof. Alternatively, step two can comprise applying the second and third microbe-based products simultaneously as one product.

In certain embodiments, the microbe of the second microbe-based product is *Bacillus subtilis* and the microbe of the third microbe-based product is *Bacillus licheniformis*.

The biopolymers and the cell biomass produced by the growth of the microbes of step two act to plug the high permeability zones of the formation, allowing for the gasses, e.g., the carbon dioxide, produced by the microbes of the first microbe-based product to reach lower permeability zones of the formation. Additionally, the biosurfactants help to mobilize oil from the formation by, for example, decreasing interfacial tension within the formation.

In some embodiments, the *Bacillus* strains of the second and third microbe-based products are capable of thriving under low oxygen conditions, thereby facilitating growth under anaerobic and microaerophilic conditions. Under these conditions, nitrate salts can be added as an electron acceptor to support anaerobic and/or microaerophilic respiration. As such, the *Bacillus* strains can act as nitrate reducing bacteria, meaning they are not sulfate reducers, or microbes that produce hydrogen sulfide. In fact, the *Bacillus* strains can out-compete those microorganisms that are considered sulfate reducers, thereby helping to reduce the hydrogen sulfide content of a well.

Step two of the subject methods can be initiated immediately after the completion of step one, or sometime after but with little time delay. In one embodiment, step two is initiated within 24 hours of the completion of step one.

In one specific embodiment, a method is provided for improved selective plugging, wherein the method comprises only step two of the method described herein. The second and third microbe-based products can be applied simultaneously, or they can be applied sequentially, where the *B. licheniformis* product is applied sometime after the *B. subtilis* product (e.g., within 24 hours after).

The subject methods are capable of enhancing oil recovery through multiple mechanisms, including, for example, plugging, repressurization, alteration in oil and formation characteristics, and others. The improved oil well performance and/or well stimulation can endure for extended periods of time, for example, from 3 to 4 weeks or more, or even from 2 to 3 months, 6 months, or longer. Furthermore, these methods can be practiced over a wide range of temperatures, including from, for example, 20° to 60° C.

Advantageously, the present invention can be used without releasing large quantities of inorganic compounds into the environment. Additionally, the subject compositions and methods utilize components that are biodegradable and toxicologically safe. Thus, the present invention can be used in oil and gas production as a "green" treatment.

DETAILED DESCRIPTION

The subject invention relates to post-primary oil recovery from oil wells. In particular, the subject invention provides cost-effective, environmentally-friendly approaches to enhancing oil recovery by activating and/or enhancing multiple mechanisms of basic wellbore stimulation using microbes, as well as by-products of their growth, such as gases, solvents, acids, biosurfactants, biopolymers and/or other metabolites.

In one embodiment, the subject invention provides microbe-based products comprising beneficial microbes and metabolites derived from these microbes and the fermentation broth in which they are produced. Efficient methods of producing these microbe-based products, as well as methods of their use to, for example, improve and/or enhance oil well performance, and/or to stimulate an oil well, are also provided. In some embodiments, the subject compositions are useful for enhancing the performance of, and/or stimulating, a marginal or stripper oil well, a well undergoing water flooding or gas injection, or to any other type of well, whether it is under-producing or producing oil at a normal rate.

Preferably, the microbe-based products are formulated based on the potential growth, metabolite production and survivability of the microbes under reservoir conditions. In certain embodiments, the microorganisms of the microbe-based products can germinate and grow in situ, i.e., inside an oil-bearing formation, and produce cell biomass and beneficial growth by-products at a treatment site. Consequently, a high concentration of the beneficial growth by-products and the microorganisms that produce them can be achieved easily and continuously at a treatment site.

In certain embodiments, the subject invention provides a method for improving oil production efficiency and/or for enhanced oil recovery, by applying to an oil-bearing formation compositions having microbes and/or growth products thereof. The method can involve from one to two steps, each of which involves injecting certain microorganisms in a certain predetermined order, based on, for example, the metabolites and by-products they are capable of producing.

Specifically, the method comprises the steps of: 1) applying a first microbe-based product to an oil well, and/or 2) applying a second and third microbe-based product to the well, either sequentially or simultaneously with one another. Each of step one and/or step two can further comprise applying nutrients that are useful for microbial growth.

In certain embodiments, the first microbe-based product comprises a gas- (e.g., carbon dioxide), acid- and/or solvent-producing species of *Clostridium* bacteria in spore form. Furthermore, the second microbe-based product preferably comprises a biosurfactant-producing strain of *Bacillus subtilis* in spore form, and the third microbe-based product preferably comprises a biopolymer-producing strain of *Bacillus licheniformis* in spore form.

Selected Definitions

As used herein, "applying" a composition or product refers to contacting it with a target or site such that the composition or product can have an effect on that target or site. The effect can be due to, for example, microbial growth and/or the action of a gas, acid, biosurfactant or other growth by-product. For example, the microbe-based compositions or products can be injected into oil wells and/or the piping, pumps, tanks, and other equipment associated with oil wells in order to reach a target site within an oil-bearing subterranean formation.

As used herein, a "biofilm" is a complex aggregate of microorganisms, such as bacteria, wherein the cells adhere to each other. The cells in biofilms are physiologically distinct from planktonic cells of the same organism, which are single cells that can float or swim in liquid medium.

As used herein, "harvested" refers to removing some or all of a microbe-based composition from a growth vessel.

As used herein, "heavy oil" or "heavy hydrocarbons" mean viscous hydrocarbon fluids. Heavy hydrocarbons may include highly viscous hydrocarbon fluids such as heavy oil, extra heavy oil, tar, and/or asphalt. Heavy and extra heavy oils are highly viscous with a density close to or even exceeding water. Heavy hydrocarbons may comprise moderate to high quantities of paraffins, resins and asphaltenes, as well as smaller concentrations of sulfur, oxygen, and nitrogen. Heavy hydrocarbons may also include aromatics or other complex ring hydrocarbons. Additional elements may also be present in heavy hydrocarbons in trace amounts. Heavy hydrocarbons may be classified by API gravity. Heavy hydrocarbons generally have an API gravity below about 20°. Heavy oil, for example, generally has an API gravity of 20° or below, whereas extra heavy oil generally has an API gravity of about 12° or below. The viscosity of heavy hydrocarbons is generally greater than about 200 cp at reservoir conditions, and that of extra heavy oil is generally about 10,000 cp or more. As used herein, an "isolated" or "purified" nucleic acid molecule, polynucleotide, polypeptide, protein, organic compound such as a small molecule (e.g., those described below), or other compound is substantially free of other compounds, such as cellular material, with which it is associated in nature. For example, a purified or isolated polynucleotide (ribonucleic acid (RNA) or deoxyribonucleic acid (DNA)) is free of the genes or sequences that flank it in its naturally-occurring state. A purified or isolated polypeptide is free of the amino acids or sequences that flank it in its naturally-occurring state. A purified or isolated microbial strain is removed from the environment in which it exists in nature. Thus, the isolated strain may exist as, for example, a biologically pure culture, or as spores (or other forms of the strain) in association with a carrier.

In certain embodiments, purified compounds are at least 60% by weight (dry weight) the compound of interest. Preferably, the preparation is at least 75%, more preferably at least 90%, and most preferably at least 99%, by weight the compound of interest. For example, a purified compound is one that is at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

A "metabolite" refers to any substance produced by metabolism (i.e., a growth by-product) or a substance necessary for taking part in a particular metabolic process. A metabolite can be an organic compound that is a starting material (e.g., glucose), an intermediate (e.g., acetyl-CoA) in, or an end product (e.g., n-butanol) of metabolism. Examples of metabolites include, but are not limited to, biosurfactants, biopolymers, enzymes, toxins, acids, solvents, gasses, alcohols, proteins, vitamins, minerals, microelements and amino acids.

As used herein, reference to a "microbe-based composition" means a composition that comprises components that were produced as the result of the growth of microorganisms or other cell cultures. Thus, the microbe-based composition may comprise the microbes themselves and/or by-products of microbial growth. The microbes may be in a vegetative state, in spore form, in mycelial form, in any other form of microbial propagule, or a mixture of these. The microbes may be planktonic or in a biofilm form, or a mixture of both. The by-products of growth may be, for example, metabolites (e.g., biosurfactants), cell membrane components, expressed proteins, and/or other cellular components. The microbes may be intact or lysed. The cells may be separated from the composition (i.e., absent), or present at, for example, a concentration of $1\times10^4$, $1\times10^5$, $1\times10^6$, $1\times10^7$, $1\times10^8$, $1\times10^9$, $1\times10^{10}$, or $1\times10^{11}$ or more cells or propagules per milliliter of the composition. As used herein, a propagule is any portion of a microorganism from which a new and/or mature organism can develop, including but not limited to, cells, conidia, cysts, spores (e.g., reproductive spores, endospores and exospores), mycelia, buds and seeds.

The subject invention further provides "microbe-based products," which are products that are to be applied in practice to achieve a desired result. The microbe-based product can be simply the microbe-based composition harvested from the microbe cultivation process. Alternatively, the microbe-based product may comprise further ingredients that have been added. These additional ingredients can include, for example, stabilizers, buffers, carriers (e.g., water or salt solutions), added nutrients to support further microbial growth, non-nutrient growth enhancers and/or agents that facilitate tracking of the microbes and/or the composition in the environment to which it is applied. The microbe-based product may also comprise mixtures of microbe-based compositions. The microbe-based product may also comprise one or more components of a microbe-based composition that have been processed in some way such as, but not limited to, filtering, centrifugation, lysing, drying, purification and the like.

As used herein, "modulate" means to alter (increase or decrease). Such alterations are detected by standard art known methods such as those described herein.

As used herein, "marginal well" or "stripper well" refers to a mature oil well that is nearing the end of its economically useful life. Marginal oil wells are generally characterized in that their daily production of crude oil has dropped to between 10 and 15 barrels per day, or less, for any twelve-month period.

As used herein, "oil production" refers to any and all operations involved in the extraction of hydrocarbons such as crude oil or natural gas from the earth through its eventual processing and use by consumers. Oil production can include, but is not limited to, drilling, pumping, recovery, transmission, processing, refining, transportation, and storage of hydrocarbons. Accordingly, an "oil production site" can include, in addition to the producing oil well, any environment, equipment, structure, or surface, whether naturally-occurring or man-made, wherein one or more aspects of hydrocarbon, oil and/or natural gas production and processing occur, including but not limited to, subterranean formations, oil and gas containing formations, drilling rigs, petroleum refineries, wellbores, oil well rods, flow lines, separators, pumps, pipes, tubing, casing, valves, fittings, gathering systems, and storage tanks.

The term "plugging," as used herein, means the adjustment of permeability in a zone or zones of an oil-bearing formation. Plugging can further comprise "permeability control." Furthermore, plugging can be selective, meaning only high permeability zones are subjected to permeability control, or non-selective, meaning permeability is controlled in any permeable zone, regardless of level of permeability. In selective plugging particularly, the high permeability zones are more effectively plugged by a plugging material and undesirable plugging of the low permeability zones is reduced. In the context of water flooding processes, when water is injected into an injection well, the result is a net decrease in water flow in the high permeability zones and better oil displacement in low permeability areas.

Ranges provided herein are understood to be shorthand for all of the values within the range. For example, a range of 1 to 20 is understood to include any number, combination of numbers, or sub-range from the group consisting 1, 2, 3, 4, 5, 6, 7, 8, 9, 10, 11, 12, 13, 14, 15, 16, 17, 18, 19, or 20 as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

As used herein, "reduces" means a negative alteration of at least 1%, 5%, 10%, 25%, 50%, 75%, or 100% and "increases" means a position alteration of at least 1%, 5%, 10%, 25%, 50%, 75%, or 100%.

As used herein, "reference" is meant a standard or control condition.

As used herein, "salt-tolerant" in relation to a microbial strain means the strain is capable of growing in a sodium chloride concentration of 15% or greater. Salt tolerance can be with respect to any one or more of a variety of salts. For example, the salt can be a monovalent salt such as a sodium or potassium salt, e.g., NaCl or KCl, or a divalent salt such as a magnesium or calcium salt, e.g., $MgCl_2$ or $CaCl_2$, or a trivalent salt. Given geographic sites to be treated, zinc, bromium, iron, or lithium salts are present in the composition or site. In preferred embodiments, the bacteria described herein are tolerant to NaCl as well as others of the aforementioned salts and are, therefore, widely useful for oil recovery. For example in Texas, zinc and/or bromium salts are also present; in Colorado, lithium salts are also present; and in Ohio and Pennsylvania, iron salts, e.g., Ferric hydroxide ($Fe(OH)_3$), Ferrous hydroxide ($Fe(OH)_2$), Iron sulfide forms: pyrite ($FeS_2$), troilite (FeS), pyrrhotite ($Fe_7S_8$), mackinawite ($Fe_9S_8$), and marcasite ($FeS_2$), Iron(II) carbonate: $FeCO_3$; Iron (III) oxide: $Fe_2O_3$ are present.

As used herein, "enhanced oil recovery," "secondary oil recovery," "tertiary oil recovery" and "post-primary oil recovery" mean supplemental oil recovery operations that are employed in an oil-bearing formation or oil well after primary oil recovery is not feasible or becomes infeasible. That is, secondary oil recovery operations are implemented if the initial formation energy is inadequate for producing oil, or has become depleted. Accordingly, tertiary oil recovery operations are implemented if secondary oil recovery efforts become inadequate.

Included within enhanced oil recovery is "improving oil recovery," which means enhancing and/or increasing the amount of hydrocarbons produced and/or increasing the rate at which they flow from an oil-bearing formation. Improving oil recovery can also involve well stimulation, and the general improvement of quality of hydrocarbon being produced, thus improving the amount of usable hydrocarbon produced without extensive need for refining and processing.

As used herein, "surfactant" refers to a compound that lowers the surface tension (or interfacial tension) between two liquids or between a liquid and a solid. Surfactants act as, for example, detergents, wetting agents, emulsifiers, foaming agents, and/or dispersants. A surfactant produced by microorganisms is referred to as a "biosurfactant."

As used herein, "water flooding" refers to the injection of fluid, such as field water or field brine, into a formation by pumping it through one or more injection wells drilled into the formation. Oil is displaced within and is moved through the formation, and is produced from one or more production wells drilled into the formation. The injection water is often referred to as "flooding liquid," "flooding water" or "flood water," as distinguished from "connate water," or the in situ formation water. Fluids injected later can be referred to as driving fluids. Although water is the most common, injection and drive fluids can include gaseous fluids such as steam, carbon dioxide, and the like.

As used herein, a "surfactant over-producing," microbe is one that has enhanced biosurfactant producing capabilities over wild type strains. In particular, *B. subtilis* strains of the present invention can have enhanced capabilities of producing, for example, the biosurfactant surfactin. The strain may produce at least 0.1-10 g/L, e.g., 0.5-1 g/L surfactant. For example, the bacteria produce at least 10%, 25%, 50%, 100%, 2-fold, 5-fold, 7.5 fold, 10-fold, 12-fold, 15-fold or more compared to other oil-recovery microbial strains. Specifically, *Bacillus subtilis* ATCC 39307 is used herein as a reference strain.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

Unless specifically stated or obvious from context, as used herein, the term "or" is understood to be inclusive. Unless specifically stated or obvious from context, as used herein, the terms "a," "and" and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

Any compositions or methods provided herein can be combined with one or more of any of the other compositions and methods provided herein.

Other features and advantages of the invention will be apparent from the following description of the preferred embodiments thereof, and from the claims. All references cited herein are hereby incorporated by reference.

Microbial Fermentation

The subject invention provides microbe-based products for use in enhanced oil recovery from oil wells. The cultivation of microorganisms and production of microbial metabolites for use according to the methods of the subject invention can range from small (e.g., lab setting) to large (e.g., industrial setting) scale. These cultivation processes include, but are not limited to, submerged cultivation/fermentation, solid state fermentation (SSF), and combinations thereof.

As used herein "fermentation" refers to growth and/or cultivation of cells under controlled conditions. The growth could be aerobic or anaerobic.

In one embodiment, the subject invention provides materials and methods for the production of biomass (e.g., viable cellular material, including spores), extracellular metabolites (e.g. small molecules, polymers and excreted proteins), residual nutrients and/or intracellular components (e.g. enzymes and other proteins).

In one embodiment, the subject invention provides methods of producing a microbial metabolite by cultivating a microbe strain of the subject invention under conditions appropriate for growth and metabolite production; and, optionally, purifying the metabolite.

The microbe growth vessel used according to the subject invention can be any fermenter or cultivation reactor for industrial use. In one embodiment, the vessel may have functional controls/sensors or may be connected to functional controls/sensors to measure important factors in the cultivation process, such as pH, oxygen, pressure, temperature, agitator shaft power, humidity, viscosity and/or microbial density and/or metabolite concentration.

In a further embodiment, the vessel may also be able to monitor the growth of microorganisms inside the vessel (e.g., measurement of cell number and growth phases). Alternatively, a daily sample may be taken from the vessel and subjected to enumeration by techniques known in the art, such as dilution plating technique. Dilution plating is a simple technique used to estimate the number of microbes in a sample. The technique can also provide an index by which different environments or treatments can be compared.

In one embodiment, the method includes supplementing the cultivation with a nitrogen source. The nitrogen source can be, for example, potassium nitrate, ammonium nitrate ammonium sulfate, ammonium phosphate, ammonia, urea, and/or ammonium chloride. These nitrogen sources may be used independently or in a combination of two or more.

The method can provide oxygenation to the growing culture. One embodiment utilizes slow motion of air to remove low-oxygen containing air and introduce oxygenated air. The oxygenated air may be ambient air supplemented daily through mechanisms including impellers for mechanical agitation of the liquid, and air spargers for supplying bubbles of gas to the liquid for dissolution of oxygen into the liquid.

The method can further comprise supplementing the cultivation with a carbon source. The carbon source is typically a carbohydrate, such as glucose, sucrose, lactose, fructose, trehalose, mannose, mannitol, and/or maltose; organic acids such as acetic acid, fumaric acid, citric acid, propionic acid, malic acid, malonic acid, and/or pyruvic acid; alcohols such as ethanol, propanol, butanol, pentanol, hexanol, isobutanol, and/or glycerol; fats and oils such as soybean oil, canola oil, rice bran oil, olive oil, corn oil, sesame oil, and/or linseed oil; etc. These carbon sources may be used independently or in a combination of two or more.

In one embodiment, growth factors and trace nutrients for microorganisms are included in the medium. This is particularly preferred when growing microbes that are incapable of producing all of the vitamins they require. Inorganic nutrients, including trace elements such as iron, zinc, copper, manganese, molybdenum and/or cobalt may also be included in the medium. Furthermore, sources of vitamins, essential amino acids, and microelements can be included, for example, in the form of extracts, such as potato extract, beef extract, soybean extract, banana extract, and the like, or in purified forms. Amino acids such as, for example, those useful for biosynthesis of proteins, can also be included.

In one embodiment, inorganic salts may also be included. Usable inorganic salts can be potassium dihydrogen phosphate, dipotassium hydrogen phosphate, disodium hydrogen phosphate, magnesium sulfate, magnesium chloride, iron sulfate (e.g., ferrous sulfate heptahydrate), iron chloride, manganese sulfate, manganese sulfate monohydrate, manganese chloride, zinc sulfate, lead chloride, copper sulfate, calcium chloride, calcium carbonate, and/or sodium carbonate. These inorganic salts may be used independently or in a combination of two or more.

In some embodiments, the method for cultivation may further comprise adding additional acids and/or antimicrobials in the liquid medium before and/or during the cultivation process. Antimicrobial agents or antibiotics are used for protecting the culture against contamination. Additionally, antifoaming agents may also be added to prevent the formation and/or accumulation of foam when gas is produced during cultivation.

The pH of the mixture should be suitable for the microorganism of interest. Buffers, and pH regulators, such as carbonates and phosphates, may be used to stabilize pH near a preferred value. When metal ions are present in high concentrations, use of a chelating agent in the liquid medium may be necessary.

The method and equipment for cultivation of microorganisms and production of the microbial by-products can be performed in a batch, quasi-continuous, or continuous processes.

In one embodiment, the method for cultivation of microorganisms is carried out at about 5° to about 100° C., preferably, 15 to 60° C., more preferably, 25 to 50° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Air can be sterilized by methods know in the art. For example, the ambient air can pass through at least one filter before being introduced into the vessel. In other embodiments, the medium may be pasteurized or, optionally, no heat at all added, where the use of low water activity and low pH may be exploited to control bacterial growth.

In one embodiment, the subject invention further provides a method for producing microbial metabolites, including but not limited to, biosurfactants, biopolymers, solvents, carbon dioxide, lactic acid, beta-glucan, proteins, peptides, metabolic intermediates, polyunsaturated fatty acids, and lipids. The metabolite content produced by the method can be, for example, at least 20%, 30%, 40%, 50%, 60%, 70%, 80%, or 90%.

The biomass content of the fermentation broth may be, for example from 5 g/l to 180 g/l or more. In one embodiment, the solids content of the broth is from 10 g/l to 150 g/l.

The microbial growth by-product produced by microorganisms of interest may be retained in the microorganisms or secreted into the liquid medium. The growth by-products may be used in a crude form without purification. Crude form metabolites can take the form of a liquid mixture comprising the metabolite suspended in or settled below the fermentation broth resulting from cultivation. This crude form solution can comprise from about 25% to about 75%, from about 30% to about 70%, from about 35% to about 65%, from about 40% to about 60%, from about 45% to about 55%, or about 50% of the pure metabolite.

In certain embodiments, the methods of producing microbial metabolites produce advantageous compositions over, for example, a purified metabolite on its own, due to the use of entire cell culture, including one or more of the following: high concentrations of mannoprotein as a part of a yeast cell wall's outer surface; the presence of beta-glucan in yeast cell walls; and/or the presence of biosurfactants and other metabolites (e.g., lactic acid, biopolymers, ethyl acetate, ethanol, etc.) in the culture.

In one embodiment, the liquid medium may contain compounds that stabilize the activity of microbial growth by-product.

In another embodiment, the method for producing a microbial growth by-product may further comprise the steps of concentrating and purifying the microbial growth by-product of interest.

In one embodiment, all of the microbial cultivation composition is removed upon the completion of the cultivation (e.g., upon, for example, achieving a desired spore density, or density of a specified metabolite in the broth). In this batch procedure, an entirely new batch is initiated upon harvesting of the first batch.

In another embodiment, only a portion of the fermentation product is removed at any one time. In this embodiment, biomass with viable cells and/or propagules remains in the vessel as an inoculant for a new cultivation batch. The composition that is removed can be a cell-free broth or contain cells and/or spores. In this manner, a quasi-continuous system is created.

Advantageously, the method does not require complicated equipment or high energy consumption. The microorganisms of interest can be cultivated at small or large scale on site and utilized, even being still-mixed with their media. Similarly, the microbial metabolites can also be produced at large quantities at the site of need.

Advantageously, the microbe-based products can be produced in remote locations. The microbe growth facilities may operate off the grid by utilizing, for example, solar, wind and/or hydroelectric power.

Microbial Strains Grown in Accordance with the Subject Invention

The microorganisms grown according to the systems and methods of the subject invention can be, for example, bacteria, yeast and/or fungi. These microorganisms may be natural, or genetically modified microorganisms. For example, the microorganisms may be transformed with specific genes to exhibit specific characteristics. The microorganisms may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frameshift mutation or repeat expansion) as compared to the reference microorganism. Procedures for making mutants are well known in the microbiological art. For example, UV mutagenesis and nitrosoguanidine are used extensively toward this end.

In preferred embodiments, the microorganisms are bacteria, including Gram-positive and Gram-negative bacteria. Even more preferably, the bacteria are spore-forming bacteria. Many bacterial species can form spores when, for example, certain nutrients in the environment become depleted, when the environment is otherwise not conducive to growth, or as a normal part of their life cycles. Spores are formed within a mother cell compartment of a sporulating cell, for example, in response to environmental cues. Once the mother cell lyses, the resilient spores are released into the environment. Other than an initial, brief metabolic spurt, spores have little or no metabolic activity and are thus considered dormant. Certain environmental cues, such as temperature and nutrients, trigger the spores to begin germinating into vegetative cells once more.

The bacteria may be, for example *Agrobacterium* (e.g., *A. radiobacter*), *Azobacter* (e.g., *A. vinelandii*, *A. chroococcum*), *Azospirillum* (e.g., *A. brasiliensis*), *Bacillus* (e.g., *B. subtilis*, *B. licheniformis*, *B. firmus*, *B. laterosporus*, *B. megaterium*, *B. amyloliquefaciens*), *Clostridium* spp., *Pseudomonas* (e.g., *P. chlororaphis* subsp. *aureofaciens* (Kluyver)), *Ralslonia* (e.g., *R. eulropha*), *Rhizobium*, *Rhodospirillum* (e.g., *R. rubrum*), and/or *Sphingomonas paucimobilis*.

In some embodiments, the microbes are selected from any spore-forming, species of bacteria capable of producing a gas, an acid and/or a solvent. In specific embodiments, the microbes are one or more species from the bacterial genus *Clostridium*, including but not limited to, *Clostridium butyricum*, *Clostridium tyrobutyricum*, *Clostridium aceto-butyricum* and *Clostridium* NIPER 7 (88% homology with *Clostridium beijerinckii*), and/or products of the growth of those microbes.

In one embodiment, the microorganism is a strain of *B. subtilis*, such as, for example, *B. subtilis* var. lotuses B1 or B2, which are effective producers of, for example, surfactin and other biosurfactants. The B strain series of *Bacillus subtilis* produce more biosurfactant compared to reference strains of *Bacillus subtilis*. Furthermore, the *Bacillus subtilis* strains survive under high salt and anaerobic conditions better than other well-known *Bacillus* strains. The strains are also capable of growing under anaerobic and/or microaerophilic conditions when supplied with, for example, nitrate salts. The *Bacillus subtilis* B series strains can also be used for producing enzymes that degrade or metabolize oil or other petroleum products. In this regard, WO 2017/044953 is incorporated herein, in its entirety, by reference.

In certain embodiments, the present invention utilizes *Bacillus subtilis* strains with enhanced biosurfactant production compared to wild type *Bacillus subtilis* as well as compared to other microbes used in oil recovery. Such *Bacillus subtilis* have been termed members of the B series, including, but not limited to, B1, B2 and B3. *Bacillus subtilis* microorganisms exemplified herein have been characterized and classified as *Bacillus subtilis*. The vegetative cells of *Bacillus subtilis* strain B1 are rods that are 0.7 to 0.9 μm wide by 1.6 to 3.3 μm long and occur singly. It is motile, Gram-positive and produces biopolymers on nutrient agar and potato dextrose agar. It also produces ellipsoidal spores centrally or paracentrally in unswollen sporangia. The size of mature spores is 0.8 to 1.0 μm wide by 1.6 to 1.9 μm long. It is a facultative aerobe with a growth temperature range of 25-55° C., with optimal growth temperature at 35° C. It hydrolyzes starch, is positive on Voges-Proskauer test, can utilize citrate and can grow with 15% NaCl.

In another embodiment, the microorganism is a strain of *Bacillus licheniformis*. *B. licheniformis* is a Gram-positive, mesophilic bacterium, capable of anaerobic growth. It can survive in harsh environments, and at temperatures ranging from 10 to 55° C. or higher, with optimal growth temperature around 50° C.

*Bacillus licheniformis* is an effective producer of biosurfactants, as well as biopolymers, including, for example, polysaccharides and levans.

Microbe-Based Products

The subject invention provides microbe-based products, as well as their use, to improve and/or enhance oil well performance, and/or stimulate oil wells.

The microbe-based products are capable of displacing residual oil from reservoirs by employing multiple mechanisms of enhanced oil recovery (EOR) and/or well stimulation. These mechanisms include, but are not limited to, selective and non-selective plugging of formation pores; formation repressurization; emulsification of crude fluids; removal of thief channels in permeable zones; modification of solid surfaces within a formation; degradation of oil and alteration of oil properties, such as viscosity and pour point; modification of reservoir rock to improve porosity and permeability; solubilization of carbonate rocks; and reduction in interfacial tension and rock wettability.

Preferably, the microbe-based products are formulated based on the potential growth, metabolite production and survivability of the microbes under reservoir conditions. In certain embodiments, the microorganisms of the microbe-based products can germinate and grow in situ, i.e., inside an oil-bearing formation, and produce beneficial growth by-products at a treatment site. Consequently, a high concentration of the beneficial growth by-products and the microorganisms that produce them can be achieved easily and continuously at a treatment site.

One microbe-based product of the subject invention is simply the fermentation broth containing the microorganism and/or the microbial metabolites produced by the microorganism and/or any residual nutrients. The product of fermentation may be used directly without extraction or purification. If desired, extraction and purification can be easily achieved using standard extraction methods or techniques known to those skilled in the art.

In a specific embodiment, a first microbe-based product is provided, comprising one or more spore-forming, gas-, acid- and/or solvent-producing bacteria, and/or growth by-products thereof. More specifically, the microbe of the first microbe-based product is capable of producing, for example, gases (e.g., carbon dioxide), acids (e.g., butyric acid or acetic acid), and/or solvents (e.g., ethanol) in anaerobic or microaerophilic environments. Preferably, the microbe is a member of the genus Clostridium, including but not limited to cultivated Clostridium butyricum, Clostridium tyrobutyricum, Clostridium acetobutyricum and Clostridium NIPER 7 (88% homology with *Clostridium beijerinckii.*

In another specific embodiment, a second microbe-based product is provided, comprising one or more spore-forming biosurfactant-producing microorganisms and/or growth by-products thereof. More specifically, the microbe of the second microbe-based product is *Bacillus subtilis*, which is an effective producer of, for example, lipopeptide biosurfactants such as surfactin.

In yet another specific embodiment, a third microbe-based product is provided, comprising one or more spore-forming biopolymer-producing microorganisms and/or growth by-products thereof. More specifically, the microbe of the third microbe-based product is *Bacillus licheniformis*, which is an effective producer of, for example, the biopolymer levan. *B. licheniformis* is also an effective producer of lipopeptide biosurfactants, such as, for example, lichenysin.

The microorganisms in the microbe-based product may be in an active or inactive form. In certain preferred embodiments, the microbes are in spore form to ensure better penetration of the microbes into a formation, including high permeability areas. After penetrating deep into the formation, the microbes can grow and produce the desired metabolites for efficient mobilization of residual oil.

The microbe-based products may be used without further stabilization, preservation, and storage. Advantageously, direct usage of these microbe-based products preserves a high viability of the microorganisms, reduces the possibility of contamination from foreign agents and undesirable microorganisms, and maintains the activity of the by-products of microbial growth.

The microbes and/or broth resulting from the microbial growth can be removed from the growth vessel and transferred via, for example, piping for immediate use.

In other embodiments, the composition (microbes, broth, or microbes and broth) can be placed in containers of appropriate size, taking into consideration, for example, the intended use, the contemplated method of application, the size of the fermentation tank, and any mode of transportation from microbe growth facility to the location of use. Thus, the containers into which the microbe-based composition is placed may be, for example, from 1 gallon to 1,000 gallons or more. In certain embodiments the containers are 2 gallons, 5 gallons, 25 gallons, or larger.

Upon harvesting the microbe-based composition from the growth vessels, further components can be added as the harvested product is placed into containers and/or piped (or otherwise transported for use). The additives can be, for example, buffers, carriers, other microbe-based compositions produced at the same or different facility, viscosity modifiers, preservatives, nutrients for microbe growth, tracking agents, pesticides, and other ingredients specific for an intended use.

Advantageously, in accordance with the subject invention, the microbe-based product may comprise broth in which the microbes were grown. The product may be, for example, at least, by weight, 1%, 5%, 10%, 25%, 50%, 75%, or 100% broth. The amount of biomass in the product, by weight, may be, for example, anywhere from 0% to 100% inclusive of all percentages therebetween.

In an exemplary embodiment, 15 barrels of microbe-based product can contain about $1\times10^1$, $10^2$, $10^3$, $10^4$, $10^5$, $10^6$, $10^7$ or $10^8$ or more spores/ml of the microbe, a carbon source (e.g., dextrose for aiding in microbial biosurfactant production, and glucose for aiding in microbial biopolymer production), nitrogen and phosphorus sources, and germination enhancers (e.g, L-Alanine).

Optionally, the product can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 20° C., 15° C., 10° C., or 5° C. On the other hand, a biosurfactant composition can typically be stored at ambient temperatures. Even further, if the cells are in spore form, the product is preferably stored and transported at a low temperature, not higher than 15° C., in order to prevent premature germination.

Local Production of Microbe-Based Products

In preferred embodiments of the subject invention, a microbe growth facility produces fresh, high-density microorganisms and/or microbial growth by-products of interest on a desired scale. The microbe growth facility may be located at or near the site of application. The facility produces high-density microbe-based compositions in batch, quasi-continuous, or continuous cultivation.

The distributed microbe growth facilities can be located at the location where the microbe-based product will be used. For example, the microbe growth facility may be less than 300, 250, 200, 150, 100, 75, 50, 25, 15, 10, 5, 3, or 1 mile from the location of use.

The microbe growth facilities of the subject invention produces fresh, microbe-based compositions, comprising the microbes themselves, microbial metabolites, and/or other components of the broth in which the microbes are grown. If desired, the compositions can have a high density of vegetative cells or propagules, or a mixture of vegetative cells and propagules.

Because the microbe-based product is generated locally, without resort to the microorganism stabilization, preservation, storage and transportation processes of conventional microbial production, a much higher density of bacteria cells and/or propagules can be generated, thereby requiring a smaller volume of the microbe-based product for use in the on-site application or which allows much higher density microbial applications where necessary to achieve the desired efficacy. This allows for a scaled-down bioreactor (e.g., smaller fermentation tank, and smaller supplies of starter material, nutrients, pH control agents, and defoaming agents), which makes the system efficient. Local generation of the microbe-based product also facilitates the inclusion of the growth broth in the product. The broth can contain agents produced during the fermentation that are particularly well-suited for local use.

Advantageously, the compositions can be tailored for use at a specified location. The microbe growth facilities provide manufacturing versatility by the ability to tailor the microbe-based products to improve synergies with destination geographies and harness the power of naturally-occurring local microorganisms and their metabolic by-products to improve oil production. Local microbes can be identified based on, for example, salt tolerance and ability to grow at high temperatures.

Advantageously, these microbe growth facilities provide a solution to the current problem of relying on far-flung industrial-sized producers whose product quality suffers due to upstream processing delays, supply chain bottlenecks, improper storage, and other contingencies that inhibit the timely delivery and application of, for example, a viable, high cell-count product and the associated broth and metabolites in which the cells are originally grown.

The microbe-based products of the subject invention are particularly advantageous compared to traditional products wherein cells have been separated from metabolites and nutrients present in the fermentation growth media. Reduced transportation times allow for the production and delivery of fresh batches of microbes and/or their metabolites at the time and volume as required by local demand.

Local production and delivery within, for example, 24 hours of fermentation results in pure, high cell density compositions and substantially lower shipping costs. Given the prospects for rapid advancement in the development of more effective and powerful microbial inoculants, consumers will benefit greatly from this ability to rapidly deliver microbe-based products.

Methods of Enhanced Oil Recovery

In certain embodiments, the subject invention provides a two-step method for improving oil production efficiency by applying microbes and/or growth products thereof to an oil-bearing formation or an oil well. Specifically, the method comprises injecting certain microorganisms into an oil well in a certain predetermined order, based on, for example, the metabolites and by-products those microbes are capable of producing.

The methods can involve one or two steps, each of which involves injecting a microbe-based product or a combination thereof, into an oil well. The order of the microbe-based products that are injected into an oil well is based on the growth by-products a particular microbe is capable of producing. Furthermore, the method can comprise applying nutrients for microbial growth with the microbe-based products.

Preferably, the microbe-based products are applied to an oil-bearing formation via injection into an oil well associated with the formation. In one embodiment, the oil well is a well with decreased oil production, for example, a stripper or marginal well. In one embodiment, the oil well is, for example, a well undergoing water flooding or gas injection, a well undergoing hydraulic fracturing, a horizontal well, a vertical well, or any other type of well producing oil and/or gas at any capacity. In one embodiment, the composition can optionally be applied with flooding waters being injected into an injection well during a water flooding operation.

The total amount of liquid, i.e., composition, that can be injected into the formation can range from about 10% to about 100% of the pore volume of the more highly permeable zones of the formation. Furthermore, from 1-500 gallons up to 1000 barrels, 10,000 barrels, or more, for example, of the composition can be applied to the composition at an injection rate of, for example, 1 to 20 gallons per minute, or 1 to 20 barrels per minute.

In one embodiment, the method of enhanced oil recovery further comprises shutting the well after application of a microbe-based product thereto for an amount of time sufficient for the microbes to acclimate to the reservoir and produce sufficient amounts of the desired metabolites. Depending on wellbore and formation conditions, a shut-in period of one minute to several hours or even days may be required to permit stimulate the oil well, allow for more efficient displacement of oil from the formation and/or provide for sufficient permeability control to occur. Typically, the length of the borehole and the downhole temperature will determine the length of any shut-in period. In general, shallow, cooler formations will require longer shut-in periods possibly extending up to 24 hours or more. Exemplary shut-in times include from about 1 hour to as long as about 1 month or more. In one embodiment, the shut in time is 1 to 2 weeks.

The improved oil well performance and/or well stimulation can endure for extended periods of time, for example, from 3 to 4 weeks or more, or even from 2 to 3 months, 6 months, or longer. Furthermore, these methods can be practiced over a wide range of temperatures, including from, for example, 20° to 60° C.

In some embodiments, formulating the microbes of the composition in the spore form allows for increased penetration of the composition in a well, as spores are smaller in size than vegetative cells. This allows the microbes of the composition to be useful in deep wells, for example, wherein the composition must flow a considerable distance after injection to reach the high permeability segments. According to the subject methods, the spores preferably become activated upon reaching the desired permeability segment, meaning that metabolite production occurs at a desired location.

In a specific embodiment, the subject method comprises two steps, wherein step one comprises applying a first microbe-based product of the subject invention to an oil well. Preferably, the microbe of the first microbe-based product is a microbe capable of producing a gas, an acid and/or a solvent under anaerobic or microaerophilic reservoir conditions. For example, the microbe can be a species of *Clostridium* bacteria.

In a specific embodiment, the first microbe-based product comprises one or more Clostridia, including but not limited to cultivated *Clostridium butyricum, Clostridium tyrobutyricum, Clostridium acetobutyricum* and *Clostridium* NIPER 7 (88% homology with *Clostridium beijerinckii*), and/growth by-products thereof.

Carbon dioxide and other gases, e.g., hydrogen and methane, produced by the microbes of the first microbe-based product can act as re-pressurizing agents within the well. Furthermore, these gases can induce oil swelling and reduce viscosity of crude oil, in addition to increasing the permeability of the formation through solubilization of carbonate rocks.

Various acids produced by the microbes of the first microbe-based product, for example, acetic acid, lactic acid, propionic acid, and butyric acid, can act to modify reservoir rocks and improve porosity and permeability of the oil-bearing formation. In specific embodiments, the acid produced by the microbes is acetic acid and/or butyric acid.

Furthermore, microbially-produced solvents, e.g., acetone, butanol, and ethanol, can help in dissolving oil and/or carbonate rock, thus further aiding in the flow of oil and the permeability and porosity of the rock formation.

In some embodiments, step one further comprises adding an aqueous solution of one or more proteolytic enzymes to the first microbe-based product prior to application in order to hydrolyze the microbial exosporium. This provides smaller sized spores (e.g., about 1 micron), which can enhance the spores' ability to penetrate the formation's high permeability zones via pore throats. The proteolytic enzymes can be either commercially available microbial peptidases or proteinases, or a microbial supernatant of bacteria, yeast and fungi containing these enzymes. The concentration of proteolytic enzyme is preferably no lower than 1 g/L of the microbe-based product.

In one embodiment, step one of the method further comprises injecting water or filtered brine after the application of the first microbe-based product. The injection of water or filtered brine aids in pushing the spores of the first microbe-based product deep into the well prior to their sporulation or germination. Delaying sporulation delays the production of metabolites, for example, carbon dioxide, until a desired time, e.g., when the plugging agents produced by the microbe-based product of step two have selectively plugged the high permeability zones of the rock formation.

When it is desired that germination of the microbial spores occurs at a specific time, or at an expedited rate, in one embodiment, the method can comprise applying a germination enhancer to the well after application of a microbe-based product. Germination enhancers can include, for example, L-alanine, manganese, L-tyrosine, L-histidine, L-tryptophan, other amino acids, and/or combinations thereof.

In certain embodiments, step one of the method is followed by step two, which comprises applying a second and third microbe-based products to the oil well. In one embodiment, the second microbe-based product, comprising a biosurfactant-producing, spore-forming bacteria and/or growth by-products thereof is applied first, followed the third microbe-based product, comprising a biopolymer-producing, spore-forming bacteria and/or growth by-products thereof. Alternatively, step two can comprise applying the second and third microbe-based products simultaneously as one product.

In certain embodiments, the microbe of the second microbe-based product is *Bacillus subtilis*, and the microbe of the third microbe-based product is *Bacillus licheniformis*.

Step two of the subject methods can be initiated immediately after the completion of step one, or sometime after but with little time delay. In one embodiment, step two is initiated within 24 hours of the completion of step one.

In one specific embodiment, the method can be useful in improved water flooding, wherein the method comprises only step two. The second and third microbe-based products can be applied simultaneously or sequentially, where the *B. licheniformis* microbe-based product is applied sometime after the *B. subtilis* microbe-based product (e.g., within 24 hours after).

Advantageously, the *Bacillus* strains of the second and third microbe-based products are capable of thriving under low oxygen conditions, thereby facilitating growth under anaerobic and microaerophilic conditions. Under these conditions, nitrate salts such as ammonium nitrate and potassium nitrate can be added for changing terminal electron acceptors from oxygen to nitrate to support anaerobic and/or microaerophilic respiration. As such, the *Bacillus* strains can act as nitrate reducing bacteria, meaning they are not sulfate reducers, or which produce hydrogen sulfide. In fact, the *Bacillus* strains can out-compete those microorganisms that are considered sulfate reducers, thereby helping to reduce the hydrogen sulfide content of a well.

In one embodiment, the *Bacillus* microbes of the second and third microbe-based products are capable of producing a biosurfactant. Biosurfactants are a structurally diverse group of surface-active substances produced by microorganisms. Biosurfactants are biodegradable and can be easily and cheaply produced using selected organisms on renewable substrates. Most biosurfactant-producing organisms produce biosurfactants in response to the presence of a hydrocarbon source (e.g., oils, sugar, glycerol, etc.) in the growing media. Other media components such as concentration of iron can also affect biosurfactant production significantly.

All biosurfactants are amphiphiles. They consist of two parts: a polar (hydrophilic) moiety and non-polar (hydrophobic) group. Due to their amphiphilic structure, biosurfactants increase the surface area of hydrophobic water-insoluble substances, increase the water bioavailability of such substances, and change the properties of bacterial cell surfaces.

Biosurfactants accumulate at interfaces, thus reducing interfacial tension and leading to the formation of aggregated micellular structures in solution. Safe, effective microbial biosurfactants reduce the surface and interfacial tensions between the molecules of liquids, solids, and gases. The ability of biosurfactants to form pores and destabilize biological membranes permits their use as antibacterial, antifungal, and hemolytic agents. Combined with the characteristics of low toxicity and biodegradability, biosurfactants are advantageous for use in the oil and gas industry for a variety of applications.

Furthermore, biosurfactants can modify the properties of the oil and the interactions between oil, water, and the porous media in which oil and gas originate, thereby increasing the mobility, and consequently the recovery, of oil.

Biosurfactants include low molecular weight glycolipids (GLs), lipopeptides (LPs), flavolipids (FLs), phospholipids, and high molecular weight polymers such as lipoproteins, lipopolysaccharide-protein complexes, and polysaccharide-protein-fatty acid complexes.

In one embodiment of the subject invention, the biosurfactants used in the composition include glycolipids such as rhamnolipids (RLP), sophorolipids (SLP), trehalose lipids (TLs) or mannosylerythritol lipids (MEL).

In a preferred embodiment, the microbial biosurfactant is a lipopeptide selected from surfactin, lichenysin, fengycin and iturin.

In one embodiment, *Bacillus subtilis* is an effective producer of, for example, surfactin, and *Bacillus licheniformis* is an effective producer of, for example, lichenysin. In one embodiment, the *Bacillus* strain is a surfactant-over-producing strain.

Other microbial strains capable of accumulating significant amounts of biosurfactants and other metabolites that have bio-emulsifying and surface/interfacial tension-reducing properties, e.g., mannoprotein and beta-glucan, can also be used in accordance with the subject invention.

In some embodiments, the biosurfactants produced by the microbes of the subject invention reduce the interfacial tension of water and oil, thus allowing the oil to flow more easily from the well, for example, after pressure in the formation increases due to water flooding or gas build-up. Additionally, the biosurfactants, alter the wettability of the rock formation and induce emulsification of the oil, further providing increased production of useful crude oil from the well.

In certain embodiments, the compositions of the subject invention have advantages over, for example, purified biosurfactants alone, due to the use of entire cell culture, which can comprise useful cellular and extracellular components, as well as metabolites, such as, e.g., biopolymers, biosurfactants, enzymes, solvents and gases, in the culture.

In one embodiment of the subject invention, oil recovery is improved by modifying the fluid flow through a reservoir by shifting fluid flow from high permeability zones in a reservoir to moderate or low permeability zones, thus increasing the sweep efficiency by, for example, carbon dioxide gas or injected water to pass through previously by-passed oil zones of the reservoir. The changes in flow pattern can be achieved by an increase in microbial cell mass within the reservoir by, for example, injecting biopolymer-producing microorganisms together with nutrients. The injected nutrient and microbes preferentially flow into the high permeability zones of the reservoir and as a result of cell growth, the biomass and/or the biopolymer growth by-products of the microbes, selectively plugs these zones to a greater extent than the moderate or low permeability zones.

As used herein, "polymer" refers to any macromolecular compound prepared by bonding one or more similar molecular units, called monomers, together. Polymers include synthetic and natural polymers. Exemplary polymers include rubbers, starches, resins, gums (e.g., guar gum, xanthan gum, and welan gum), neoprene, nylon, PVC, silicone, cellulose, polystyrene, polyethylene, polypropylene, polyacrylonitrile, polyamines, polysaccharides, polynucleotides, polybutylene adipate terephthalate (PBAT), polyhydroxyalkanoates (PHAs), polybytlene succinate (PBS), polycaprolactone (PCL), polyglycolic acid (PGA), polyhydroxybutyrates (PHBs), polyesters such as polylactide (PLA), polyacrylamides (PAM), and others.

Further included in the term polymer is the term "biopolymer," "biological polymer" or "renewable polymer," which as used herein, means a natural polymeric substance, or a polymeric substance occurring in a living organism and that is characterized by its ability to biodegrade. Biopolymers can include polynucleotides (e.g., RNA and DNA), polysaccharides (e.g., linearly bonded polymeric carbohydrates), and polypeptides (i.e., short polymers of amino acids). Specific examples of biopolymers include, but are not limited to, levans, rubbers, suberin, melanin, lignin, cellulose, xanthan gum, guar gum, welan gum, alginate, and many others.

Various polymers and biopolymers can be useful according to the subject methods. Preferably, the biopolymers and the cell biomass produced by the growth of the microbes of step two act to plug the high permeability zones of the well, allowing for the gasses, e.g., the carbon dioxide, produced by the microbes of the first microbe-based product to reach lower permeability zones of the formation.

In certain embodiments, the biopolymer exhibits selective penetration. A polymer that exhibits selective penetration will show preference in the high permeability zones of a formation when both high and low permeability zones are present. In other words, the polymer is capable of being preferentially diverted into higher permeability zones on its own, without the use of mechanical diversion, wherein it can adsorb onto rock surfaces, thus reducing the permeability through the rock pores.

In particular embodiments, the biopolymer useful according to the subject invention is levan. Levans are fructose polymers synthesized by a broad range of microorganisms and a limited number of plant species as non-structural storage carbohydrates. Levans belong to a larger group of commercially important polymers, referred to as fructans, which are used as a source of prebiotic fiber.

In one embodiment, where only a reduction in permeability of the high permeability segments is desired rather than total plugging, the composition can be formulated in such a manner as to allow, for example, only partial plugging of the high permeability zones.

In one embodiment, the second and/or third microbe-based product can further comprise added polymer compounds, including, for example, hydrogels, acrylic acid, acrylamide, polyacrylamide (PAM), hydrolyzed polyacrylamide (HPAM), polysaccharides, xanthan gum, guar gum, welan gum, lignin, and cellulose.

In a further embodiment, the method can be applied in combination with polymer flooding methods. Polymer flooding may involve addition of polymers to the water of a water-flood to decrease its mobility. Polymers increase the viscosity of the aqueous phase as well as reduce water permeability due to mechanical entrapment, consequently resulting in more favorable mobility ratios. With a more viscous phase, the collected oil bank can be more easily moved through the reservoir and eventually into the producing well.

Certain microbial-produced enzymes are also useful in the methods of the subject invention. Enzymes produced by the microbes of the subject microbe-based products can act to cleave carbon bonds and produce lower carbon-number hydrocarbons, reducing the viscosity of the crude oil so that it flows more easily. Furthermore, enzymes can modify the interactions between oil, water, and the surrounding porous media, thus increasing the mobility of the oil and consequently the recovery of oil, particularly from depleted and marginal reservoirs. Types of enzymes that may be produced by the subject microbes include oxygenases, peroxidases (including haloperoxidases), hydroxylases, and dehydrogenases, proteases, esterases, lipases, oxidoreductases, hydrolases, lyases, cellulases, hemi-cellulases, pectinases, xanthanases, xylanases, mannanases, glucosidases, galactosidases, amylases, and others.

In one embodiment, the subject invention provides methods of stimulating an injection well to increase oil flow and production from a well or oil-bearing formation, wherein the composition of the subject invention is applied to an oil-bearing formation. The composition can optionally be applied with flooding waters being injected into an injection well.

In additional embodiments, the subject invention can be used for controlling water intrusion into a producing well. In particular, the compositions and methods are useful for treating high fluid permeability segments lying outside oil-bearing strata, and in particular are useful for treating water-bearing segments that may interfere with enhanced recovery of oil from oil-bearing strata. Although in most cases the water-bearing layer is below the oil-bearing stratum, those skilled in the art will appreciate that the subject method can also be used to block water-containing layers, for example quick-sand layers disposed above the oil-bearing strata.

Advantageously, the subject method can be used to enhance oil production by activating multiple well stimulation mechanisms that alter the solid surfaces of a rock formation and the properties of crude oil. More specifically, these include, but are not limited to: re-pressurizing a reservoir with, e.g., microbial-produced gases; reducing the permeability of a subsurface geological formation by selective or non-selective plugging with, e.g., cell biomass and microbial-produced biopolymers; modifying reservoir rock to improve porosity and permeability with, e.g., microbial-produced acids; dissolving and/or degrading hydrocarbon substances with, e.g., microbial-produced solvents; and reducing interfacial tension, altering rock wettability, reducing viscosity and pour point of crude oil, including heavy oil, and inducing emulsification of reservoir fluids with, e.g., microbial-produced biosurfactants and other growth products.

Advantageously, the present invention can be used without releasing large quantities of inorganic compounds into the environment. Additionally, the subject compositions and methods utilize components that are biodegradable and toxicologically safe. Thus, the present invention can be used in oil and gas production as a "green" treatment.

EXAMPLES

A greater understanding of the present invention and of its many advantages may be had from the following examples, given by way of illustration. The following examples are illustrative of some of the methods, applications, embodiments and variants of the present invention. They are not to be considered as limiting the invention. Numerous changes and modifications can be made with respect to the invention.

Example 1—Two-Step Treatment of Oil Wells for Enhanced Oil Recovery

Oil can be recovered from an oil-bearing reservoir using the following exemplary procedures. All microbes and/or microbe-based products used according to these procedures should be stored and transported at temperatures no greater than 15° C. in order to prevent premature germination of spores.

Step 1

A microbe-based product comprising spores of one or more species of *Clostridium* is introduced (i.e., injected) into the well. No less than $10^5$ spores/ml of the microbe-based product is injected into the well. The *Clostridium* species can be selected from *Clostridium butyricum, Clostridium tyrobutyricum, Clostridium acetobutyricum, Clostridium* NIPER 7 (88% homology with *Clostridium beijerinckii*), and other gas-, acid- and/or solvent-producing *Clostridia*.

Nutrients can also be introduced with the microbe-based product, comprising an aqueous solution of molasses (1.0-2.0%) and essential salts (1.0% each of potassium, phosphorous, and magnesium).

Additionally, an aqueous solution of proteolytic enzymes can be introduced with the microbe-based product. These proteolytic enzymes can include commercially available microbial peptidase/proteinase or a supernatant of bacteria, yeast and fungi containing these enzymes in the concentration no lower than 1 gram per liter of the *Clostridium*-based product.

After the microbe-based product of step one is introduced into the well, a substantial amount of water or filtered brine is then introduced into the well to push the *Clostridium* spores deeper into the formation. For example, from about 100 to about 100,000 or more barrels of water or filtered brine can be introduced at a rate of about 0.5 to about 20 barrels per minute.

Step 2

Following the injection of water or filtered brine, a second microbe-based product is introduced into the well. This can be performed immediately after completion of the water or brine injection, or within about 24 hours of completion of the water or brine injection.

The second microbe-based product can comprise spores of bacterial species from the genus *Bacillus*, including but not limited to *Bacillus licheniformis, Bacillus subtilis*, and other *Bacillus* species that secrete plugging biopolymers, biosurfactants, enzymes and solvents useful in enhanced oil recovery. Preferably, no less than $10^7$ spores/ml of *Bacillus* are present in the second microbe-based product.

Nutrients can also be added with the *Bacillus* spores. In particular, the nutrients should be chosen from those that ensure anaerobic/microaerophilic growth of the microbes. An exemplary nutrient formulation comprises nitrate salts, including ammonium nitrate and potassium nitrate, molasses (1.0-2.0%), yeast extract (0.2-0.5%) and small amounts of phosphorous and magnesium salts (0.1% each).

The second microbe-based product can also comprise sucrose or standard baking sugar (1.0-2.0 g/L of the microbe-based product). This can help enhance the biopolymer (levan) production by *Bacillus licheniformis*.

The second microbe-based product can also comprise manganese and ferrous salts (0.002-0.005% each) in small amounts to enhance the biosurfactant (surfactin) production by *Bacillus subtilis*.

Additionally, 0.05 to 0.1% L-alanine can be added to the microbe-based product if and when an increased rate of *Bacillus* spore germination is desired. L-alanine is a germination enhancer, so timing of administering this component should be determined carefully depending on when the growth and by-product production of *Bacillus* spores is desired.

After application of the second microbe-based product, the well should be shut in order to allow all of the microbes to acclimate to the reservoir and produce sufficient amounts of gasses, solvents, acids, enzymes, biopolymers, biosurfactants, and/or any other desirable metabolites. For example, shut in time should continue for a period until pressure increases in the production well due to the production of carbon dioxide. Ideal shut-in time runs from about 1 to about 2 weeks.

Example 2—One-Step Treatment of Oil Wells for Enhanced Oil Recovery

Two oil wells are treated using 160 barrels (25,600 liters) of a composition comprising ingredients in the following amounts:

|    | Component | Amount |
|----|-----------|--------|
| 1  | Potassium nitrate (1%) | 25.6 kg (56.3 lbs.) |
| 2  | Ammonium nitrate (1%) | 25.6 kg (56.3 lbs.) |
| 3  | Ammonium hydroxide (2%) | 51.2 L (13.5 gal) |
| 4  | Yeast extract (0.2%) | 5.2 kg (11.4 lbs.) |
| 5  | Molasses (1.5%) | 38.4 kg (84.5 lbs.) |
| 6  | Sugar (0.5%) | 12.8 kg (28.2 lbs.) |
| 7  | Ammonium phosphate (0.1%) | 2.6 kg (5.7 lbs.) |
| 8  | Magnesium sulfate (0.1%) | 2.6 kg (5.7 lbs.) |
| 9  | Manganese sulfate monohydrate (0.002%) | 0.052 kg (0.114 lbs.) |
| 10 | Ferrous sulfate heptahydrate (0.002%) | 0.052 kg (0.0114 lbs.) |
| 11 | Microbial culture: combination of *Bacillus licheniformis* and *Bacillus subtilis* | about 400 liters (105 gallons or 2.5 barrels) |
| 12 | L-Alanine | 1.0 kg (2.2 lbs.) |

Compounds 1 through 8 are divided into two equal portions, mixed and dissolved in hot water in two different IBCs the day before treatment of the wells. Sufficient mixing and time is allotted to ensure the absence of any non-dissolved particles.

On the day of treatment, compounds 9, 10 and 11 are also divided into two equal portions, each of which is poured into one of the two IBCs. These compounds are added closer to treatment time in order to keep the product in the spore form as long as possible. This is important for better permeation of the product into the formation. Then the contents of the IBCs are pumped into 80 gallon truck tanks for transportation to the wells and topped off with 60-70 barrels of cold water. The mixture of compounds 1 through 8 can alternatively be pumped first into the truck tank, followed by the pouring of compounds 9 through 11 and the cold water directly into the tank.

Pumping of the solution in the tanks into the formation is then begun. After about 65 to 75% of the volume of mixture enters the formation, the final component, compound 12, is added to the remaining volume of the mixture in the tanks. Compound 12 is not dissolved in the tanks, instead it is prepared beforehand in two plastic flasks by dissolving 0.5 kg in one gallon of water. This product is a germination enhancer and should not be added before the pumping, but instead it should enter the formation with the last portions of the composition.

After a shut in time of 2 weeks, these materials and methods can be useful for enhanced oil recovery and well stimulation, with well stimulation causing increased production for several weeks or months, or longer.

Example 3—Production of *Bacillus subtilis*

Fermentation of *Bacillus subtilis* var. lotuses can be performed in a 500 L reactor with 350 L of a nutrient medium containing (g/L):

| | | |
|---|---|---|
| Glucose | 18 | |
| Powder molasses | 2 | |
| Sucrose | 1 | |
| $KH_2PO_4$ | 0.5 | |
| $Na_2HPO_4 \cdot 7H_2O$ | 2.1 | |
| KCl | 0.1 | |
| $MgSO_4$ | 0.5 | |
| $CaCl_2$ | 0.05 | |
| Urea | 2.5 | |
| $NH_4Cl$ | 1.24 | |
| Yeast extract | 2 | |
| Corn peptone | 0.5 | |
| TekNova trace element (mL) | 1 | |
| pH 6.8 | | |

Temperature of cultivation is 40° C., pH stabilization is from 6.8-7.0, and DO stabilization is at 30% (concentration of oxygen in the air is taken as 100%). Duration of cultivation is 24-32 hours. The final concentration of bacterial culture is no less than $1 \times 10^9$ CFU/ml.

The amount of culture manufactured by a single fermentation cycle allows for the production of more than 2,000 barrels of final treatment formulation containing $10^6$ CFU of this strain of *Bacillus*.

Example 4—Crude Oil Recovery from Aged Sand by Biosurfactant Solutions

To assess the oil recovery capabilities of biosurfactants, an oil/sand mixture was prepared in a ratio of 1:14 and aged for 4 days at 50° C. 50 g of aged sand was placed in a glass cylinder with 50 ml of 0.2% single biosurfactant solution or 0.2% biosurfactant combination solution.

Within the 4-day period, up to 60% of entrapped crude oil was recovered from the aged sand in temperatures ranging from 30 to 70° C. Additionally, the combination containing a mixture of biosurfactants exhibited higher recovery capabilities compared to the use of single surfactants, which ranged from only 20 to 30% recovery enhancement.

Example 5—Crude Oil Recovery from Aged Sand by *Bacillus subtilis* Culture

To assess the oil recovery capabilities of *Bacillus subtilis*, an oil/sand mixture was prepared in a ratio of 1:14 and aged for 4 days at 50° C. 50 g of aged sand was placed in a glass cylinder with 50 ml of *Bacillus subtilis* culture.

Within the 4-day period, up to 60% of entrapped crude oil was recovered from the aged sand in temperatures ranging from 30 to 70° C.

Example 6—Solid State Fermentation of *Bacillus subtilis* and *Bacillus licheniformis*

*Bacillus subtilis* and *Bacillus licheniformis* can be cultivated using solid state fermentation methods. The medium is simple, comprising only corn flour (partially hydrolyzed corn meal). Optionally, added nutrients can be included to enhance microbial growth, such as, for example, salts, molasses, starches, glucose, sucrose, etc.

Foil-covered trays are autoclaved prior to inoculation. The culture medium is spread on the trays in a layer about 1 to 2 inches thick. Grooves and/or holes can be made in the medium to increase the surface area of the medium. This will increase the depth of microbial growth and permeability within the culture, thus increasing the concentration of microbes grown. To increase the speed of growth, i.e., increase the motility of the bacteria and distribution throughout the culture medium, potato extract or banana peel extract can be added to the culture.

Spores of the *Bacillus* strain of choice are then sprayed onto the surface of the medium and the trays are placed in a fermentation vessel at a temperature between 32-40° C. Ambient air is pumped through the vessel to stabilize the temperature.

Concentration of microbes grown according to this method when dissolved in water reach at least $5 \times 10^9$ to $5 \times 10^{10}$ spores/mL. The product is then diluted with water (and added nutrients, if desired) in a mixing tank to a concentration of $1 \times 10^6$ to $1 \times 10^7$ spores/mL. Nutrients include, e.g., potassium salts (0.1% or lower), molasses and/or glucose (1-5 g/L), and nitrates.

Activation of the spores within the oil-bearing formation or other site of application can be enhanced by adding germination enhancers, such as L-alanine in low (micromolar) concentrations, and/or manganese.

Advantageously, this method does not require sterilization like that required by submerged fermentation methods. It also does not require stabilization of, e.g., pH, or other fermentation parameters. Furthermore, there is no need for de-contamination to prevent bacteriophage lysis because the growth of microbes according to this method is slower than that of submerged culture, which is directly related to a decrease or absence of bacteriophages in the culture.

What is claimed:

1. A method for enhanced oil recovery from an oil-bearing formation, said method comprising:

A) injecting a first microbe-based product into an oil well; followed by

B) injecting a second microbe-based product and a third microbe-based product into the oil well, wherein the first microbe-based product comprises one or more microorganisms selected from the group consisting of *Clostridium butyricum, Clostridium tyrobutyricum, Clostridium acetobutyricum, Clostridium* NIPER 7, and growth by-products thereof selected from the group consisting of butyric acid and acetic acid;

wherein the second microbe-based product comprises a surfactin over-producing strain of *Bacillus subtilis* and/or growth by-products thereof; and wherein the third microbe-based product comprises *Bacillus licheniformis* and/or growth by-products thereof, wherein the growth by-products are selected from the group consisting of levan and lichenysin.

2. The method of claim 1, wherein the microorganisms of the first, second and third microbe-based products are injected into the oil well in spore form.

3. The method of claim 1, wherein the microorganisms of the first microbe-based product produce carbon dioxide gas.

4. The method of claim 1, wherein A) further comprises adding an aqueous solution of one or more proteolytic enzymes to the first microbe-based product at a concentration of at least 1 g/L of the first microbe-based product.

5. The method of claim 1, wherein A) further comprises injecting water or filtered brine into the oil well after injection of the first microbe-based product.

6. The method of claim 1, wherein B) comprises injecting the second and third microbe-based products into the oil well simultaneously.

7. The method of claim 1, wherein B) comprises injecting the second microbe-based product prior to injecting the third microbe-based product.

8. The method of claim 1, wherein A) and/or B) further comprise injecting nutrients for microbial growth and/or germination enhancers.

9. The method of claim 1, wherein B) occurs 24 hours or less after A).

10. The method of claim 1, further comprising the step of shutting the oil well for about 1 week to about 2 weeks after B).

11. The method of claim 1, used for improved selecting plugging in the oil well.

* * * * *